United States Patent [19]

Schoening et al.

[11] Patent Number: 4,713,213
[45] Date of Patent: Dec. 15, 1987

[54] NUCLEAR REACTOR PLANT HOUSED IN A STEEL PRESSURE VESSEL WITH A GAS COOLED SMALL HIGH TEMPERATURE REACTOR

[75] Inventors: Josef Schoening, Hambruecken; Claus Elter, Bad Durkheim, both of Fed. Rep. of Germany

[73] Assignee: Hochtemperatur-Reaktorbau GmbH, Fed. Rep. of Germany

[21] Appl. No.: 811,111

[22] Filed: Dec. 18, 1985

[30] Foreign Application Priority Data

Dec. 18, 1984 [DE] Fed. Rep. of Germany ....... 3446101

[51] Int. Cl.$^4$ .............................................. G21C 15/18
[52] U.S. Cl. .................................... 376/299; 376/391; 376/406
[58] Field of Search ............... 376/298, 299, 381, 391, 376/406

[56] References Cited

U.S. PATENT DOCUMENTS

| 2,946,732 | 7/1960 | Wootton | 376/391 |
| 3,110,288 | 11/1963 | Worley | 376/391 |
| 3,150,051 | 9/1964 | Ammon | 376/298 |
| 3,203,867 | 8/1965 | Williams et al. | 376/402 |
| 3,305,450 | 2/1967 | Maldague | 376/406 |
| 3,341,424 | 9/1967 | Schlicht et al. | 376/406 |
| 3,384,549 | 5/1968 | Deliege et al. | 376/406 |
| 3,520,356 | 7/1970 | Bell et al. | 376/298 |

FOREIGN PATENT DOCUMENTS

| 1115846 | 10/1961 | Fed. Rep. of Germany | 376/299 |
| 3149794 | 6/1983 | Fed. Rep. of Germany | 376/381 |
| 3212266 | 6/1983 | Fed. Rep. of Germany | 376/299 |
| 3212264 | 10/1983 | Fed. Rep. of Germany | . |
| 34352554 | 4/1986 | Fed. Rep. of Germany | . |
| 1485832 | 6/1967 | France | 376/391 |
| 451204 | 5/1968 | Switzerland | 376/406 |
| 1421826 | 1/1976 | United Kingdom | 376/298 |

Primary Examiner—Deborah L. Kyle
Assistant Examiner—Richard W. Wendtland
Attorney, Agent, or Firm—Robert J. Koch

[57] ABSTRACT

A nuclear reactor plant housed in a steel pressure vessel comprises a small high temperature reactor and a He/He heat exchanger located above the reactor, preferably followed by two circulating blowers connected in parallel. The installation further comprises at least one decay heat removal system, following in line the He/He heat exchanger in the direction of flow and with the entire flow of primary helium constantly flowing through it. In a preferred embodiment, the He/He heat exchanger is made up of two concentrically arranged coil bundles connected in succession, through which both the primary and the secondary helium are flowing in opposing directions.

19 Claims, 1 Drawing Figure

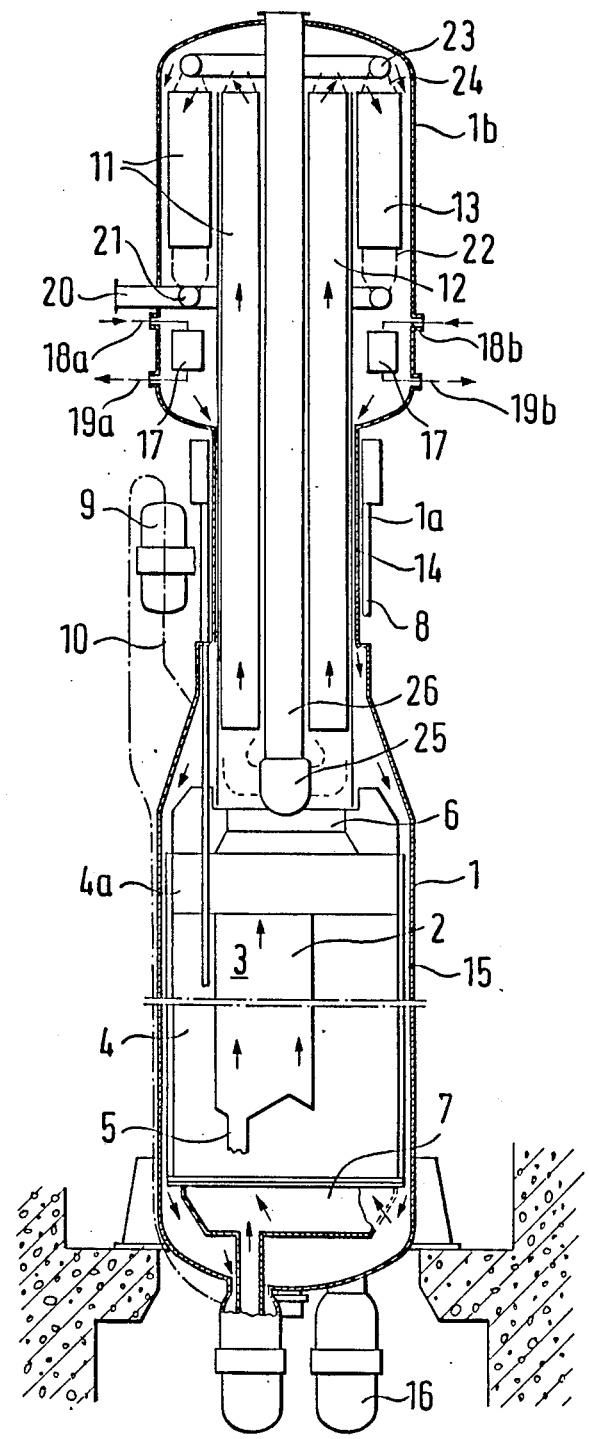

NUCLEAR REACTOR PLANT HOUSED IN A STEEL PRESSURE VESSEL WITH A GAS COOLED SMALL HIGH TEMPERATURE REACTOR

BACKGROUND OF THE INVENTION

1. Field of the Invention

The invention concerns a nuclear reactor plant housed in a steel pressure vessel. More particularly, a plant with a gas cooled, small high temperature reactor, the core of which contains a pile of spherical fuel elements through which a cooling gas flows from bottom to top. A heat utilization system placed in the flow of cooling gas is installed above the small high temperature reactor in a reactor pressure vessel, followed in line preferably by two circulating blowers with at least one decay heat exchanger installed in the steel pressure vessel.

2. Description of the Prior Art

A nuclear reactor installation is described in DE P No. 34 35 255.4. In this plant the decay heat exchangers on the primary side are installed immediately following in the direction of flow the main heat exchangers forming the heat utilization system and are traversed constantly by the entire flow of cooling gas. They are arranged under the main heat exchanger. On the secondary side the decay heat exchangers are connected by means of a decay heat removal water circulation loop with a geodesically higher located recooling heat exchanger, which in turn is connected with a further heat sink, such as for example a cooling tower.

A plant for the nuclear generation of heat is shown in DE-OS No. 32 12 264, which also uses a small high temperature reactor as the source of energy. This small high temperature reactor is designed so that different heat utilization systems, such as steam generators, split tubular furnaces or He/He heat exchangers may be connected with it. There are no special installations in this plant for the removal of decay heat.

SUMMARY OF THE INVENTION

It is an object of the present invention to design a nuclear reactor plant housed in a steel pressure vessel, with a gas cooled small high temperature reactor, the core of which contains a pile of spherical fuel elements traversed from bottom to top by a cooling gas, with a heat utilization system arranged in the flow of cooling gas and installed above the small high temperature reactor in the reactor pressure vessel and which is followed in line preferably by two circulating blowers, and with at least one decay heat exchanger installed in the steel pressure vessel so that heat generated may be removed in an intermediate circulation loop and the safe removal of the decay heat from the reactor core is assured.

This object is attained by the following characteristics:

a. The heat utilization system comprises He/He heat exchanger, in which the primary helium transfers its heat to a secondary helium flow circulating in an intermediate loop;

b. The He/He heat exchanger comprises at least one annular helix coil bundle extending to a hot gas collector chamber located above the reactor core and exposed from below to hot gas;

c. The decay heat exchanger is arranged in the direction of flow immediately following the He/He heat exchanger and is constantly traversed by the entire flow of the cooling gas;

d. The circulating blowers located in the flow of cold gas are connected parallel with respect to each other.

The hot gas coming from the small high temperature reactor flows through a roof reflector into the hot gas collector chamber and enters the He/He heat exchanger from below, where it flows around the bundle of tubes while transferring its heat to the secondary helium flowing in the tubes. The cooled primary helium is conducted to the circulating blowers. After passing through the circulating blowers the cold primary helium is returned to the reactor core, which it enters from below.

Decay heat is removed by means of the decay heat exchangers located in the primary circulation loop, which in normal operation is exposed on the primary side to the temperature of the cold gas. No special butterfly valves or blowers are required for the decay heat exchangers and none are therefore provided. In case of a failure of the two circulating blowers for the He/He heat exchangers, the decay heat is removed by natural convection. As the He/He heat exchanger is under the same pressure on the primary and the secondary side, it is not endangered by the decay heat removal operation.

An alternative solution may be seen in removing the decay heat of a small high temperature reactor combined with a He/He heat exchanger by means of the heat exchangers arranged in the secondary heat circulation loop.

Advantageous further developments of the invention are set forth in the dependent claims and the description below of a preferred embodiment.

BRIEF DESCRIPTION OF THE DRAWINGS

The schematic drawing shows a nuclear reactor plant according to the invention in a longitudinal section.

DETAILED DESCRIPTION OF THE PREFERRED EMBODIMENT

The FIGURE shows a steel pressure vessel 1 with a cylindrical cross section, drawn-in in its center part 1a and expanding in its upper part 1b. In the principal part, the lower part, a small high temperature reactor 2 is installed, the core 3 whereof consists of a pile of spherical fuel elements. The pile is surrounded on all sides by a graphite reflector 4. The fuel elements are removed by means of four pebble extraction tubes 5 from the core 3. The fuel elements are added in from above (not shown). The cooling gas primary helix flows through the fuel element pile from bottom to the top. Over the roof part 4a of the graphite reflector 4 there is a hot gas collector chamber 6. A cold gas collector chamber 7 is provided under the core 3.

Around the drawn-in part 1a of the steel pressure vessel 1 is a plurality of absorber rods 8 arranged on the pitch circle with a diameter smaller than that of the lower portion of the steel pressure vessel 1. The absorber rods are insertable into the graphite reflector 4 for the shutdown and control of the small high temperature reactor 2. Reservoirs 9 for small absorber pebbles are mounted in close proximity to the pressure vessel, outside said vessel. The absorber pebbles, which are introduced through conduits 10 into the core 3 and removed by means of the pebble extraction tubes 5, represent a second shutdown system for the small high temperature reactor.

A heat utilization system is located in the center part 1a and the upper part 1b of the steel pressure vessel 1, which in the present case is a He/He heat exchanger 11. It comprises in this exemplary embodiment two separate annular coil bundles 12 and 13, arranged concentrically and connected in series. The two coil bundles 12 and 13 have different lengths, with the inner, longer coil bundle 12 extending to the hot gas collector chamber 6 and the shorter, outer coil bundle 13 being included in the pressure vessel 1b.

The hot primary helium flows from the hot gas collector chamber 6 from below into the coil bundle 12 and is conducted on the outside along the bundle tubes upward, while transferring its heat to the secondary helium flowing through the bundle tubes. At the upper end of the inner coil bundle 12 the primary helium is reversed and enters from above the outer coil bundles 13, wherein it is cooled down further.

By means of an annular conduit 14 located between the steel pressure vessel 1 and the jacket of the heat exchanger, and the annular gap 15 provided between the steel pressure vessel 1 and the graphite reflector 4, the cold primary helium is conducted to the bottom of the steel pressure vessel 1, on which on the outside two circulating blowers 16 connected in parallel, are mounted. The circulating blowers 16 move the cold helium back into the cold gas collector chamber 7.

In the upper part 1b of the vessel, within the outer coil bundle 13 an annular decay heat exchanger 17 is installed; it follows in line on the primary side the outer coil bundle 13 and is therefore in normal operation located in the flow of cold gas. It is arranged concentrically on the inner coil bundle 12. The decay heat exchanger 17 may be divided in two systems, equipped with separate feed water lines 18a and 18b and the discharge lines 19a and 19b, respectively.

To conduct the secondary side helium to the He/He heat exchanger 11, several connection fittings 20 are mounted laterally on the upper part 1b of the vessel, between the decay heat exchanger 17 and the outer coil bundle 13, and connected with a ring header 21. From the ring header 21, conduits lead to the heating surface tubes of the outer coil bundles 13.

Above the outer coil bundle 13 a further ring header 23 is provided, wherein the secondary helium heated by the hot primary helium flowing in the opposite direction on the jacket side, is collected and then conducted—through the lines 24—to the heating surface tubes of the inner coil bundle. In these tubes the gas flows downward and enters an outlet header 25. The latter is connected with a tube 26 passing through the center of the inner coil bundle 12 and exiting on top from the steel pressure vessel 1. The secondary helium is removed by the tube 26 and conducted to its place of utilization.

What is claimed is:

1. A nuclear reactor plant comprising a gas cooled small high temperature reactor, housed in a steel pressure vessel, the reactor having a core containing a pile of spherical fuel elements and traversed from bottom to top by a flow of primary helium gas,
   a heat utilization system arranged in the flow of cooling gas and installed above the small high temperature reactor in the reactor pressure vessel and which is followed in line preferably by two circulating blowers connected in parallel;
   the heat utilization system comprising a He/He heat exchanger in which the primary helium transfers its heat to secondary helium circulating in an intermediate circulation loop;
   the He/He heat exchanger comprises an inner annular coil bundle, extending to a hot gas collector chamber located above the reactor core and exposed from below to hot primary helium cooling gas and an outer coil bundle arranged concentrically and connected successively where the inner coil bundle is of greater length than the outer coil bundle and only the inner coil bundle extends to the hot gas collector chamber;
   at least one decay heat exchanger installed in the steel pressure vessel;
   the decay heat exchanger is arranged immediately following the He/He heat exchanger in the direction of flow, and is constantly traversed by the entire flow of cooling gas.

2. A nuclear reactor plant according to claim 1 wherein the steel pressure vessel comprises a drawn-in center part and a re-expanding upper part, with the latter containing the outer coil bundle and the heat exchanger.

3. A nuclear reactor plant according to claim 1, wherein the direction of the flow of primary helium is reversed at an upper end of the inner coil bundle and that the outer coil bundle is exposed to the flow of cooling gas from above.

4. A nuclear reactor plant according to claim 1, wherein the decay heat exchanger has an annular configuration and surrounds the inner coil bundle concentrically below the outer coil bundle.

5. A nuclear plant according to claim 4, wherein the steel pressure vessel comprises a drawn-in center part and a re-expanding upper part with the latter containing the outer coil bundle and the heat exchanger.

6. A nuclear reactor plant according to claim 1, wherein circulating blowers are arranged under the steel pressure vessel.

7. A nuclear plant according to claim 1, wherein the steel pressure vessel has a drawn-in center part and the two circulating blowers are mounted laterally on the steel pressure vessel in an area of the drawn-in center part and shielded against the steel pressure vessel.

8. A nuclear reactor plant according to claim 5, further comprising on the upper part of the pressure vessel, between the decay heat exchanger and the outer coil bundle several connection fittings for inletting of the secondary helium mounted laterally, said fittings leading to a ring header which is connected by the lines with heater surface tubes of the outer coil bundle.

9. A nuclear reactor plant according to claim 8, further comprising a further ring header above the outer coil bundle provided for collecting the secondary helium, means for conducting the secondary helium connecting the ring header of the lines with heater surface tubes of the inner coil bundle.

10. A nuclear reactor plant according to claim 9, further comprising a tube arranged in the center of the inner coil bundle for return of the heated secondary helium, said tube being connected to the inner coil bundle by an outlet header under the inner coil bundle.

11. A nuclear reactor plant according to claim 4, further comprising on the upper part of the pressure vessel, between the decay heat exchanger and the outer coil bundle several connection fittings for inletting of the secondary helium mounted laterally, said fittings leading to a ring header which is connected by the lines with heater surface tubes of the outer coil bundle.

12. A nuclear reactor plant according to claim 11, further comprising a further ring header above the outer coil bundle provided for collecting the secondary helium, means for conducting the secondary helium the ring header connecting of the lines with heater surface tubes of the inner coil bundle.

13. A nuclear reactor plant according to claim 12, further comprising a tube is arranged in the center of the inner coil bundle for return of the heated secondary helium, said tube being connected to the inner coil bundle by an outlet header under the inner coil bundle.

14. A nuclear reactor plant according to claim 3, further comprising on the upper part of the pressure vessel, between the decay heat exchanger and the outer coil bundle connection fittings for inletting of the secondary helium mounted laterally, said fittings leading to a ring header which is connected by the lines with heater surface tubes of the outer coil bundle.

15. A nuclear reactor plant according to claim 14, further comprising a a further ring header above the outer coil bundle provided for collecting the secondary helium, means for conducting the secondary helium the ring header connecting with heater surface tubes of the inner coil bundle.

16. A nuclear reactor plant according to claim 15, further comprising a tube arranged in the center of the inner coil bundle for return of the heated secondary helium, said tube being connected to the inner coil bundle by an outlet header under the inner coil bundle.

17. A nuclear plant according to claim 2, wherein the two circulating blowers are mounted laterally on the steel pressure vessel in an area of the drawn-in center part and shielded against the steel pressure vessel.

18. A nuclear reactor plant according to claim 17, further comprising on the upper part of the pressure vessel, between the decay heat exchanger and the outer coil bundle several connection fittings for inletting of the secondary helium mounted laterally, said fittings leading to a ring header which is connected by the lines with heater surface tubes of the outer coil bundle.

19. A nuclear reactor plant according to claim 18, further comprising a tube arranged in the center of the inner coil bundle for return of the heated secondary helium, said tube being connected to the inner coil bundle by an outlet header under the inner coil bundle.

* * * * *